US011521254B2

(12) United States Patent
Lancewicki et al.

(10) Patent No.: US 11,521,254 B2
(45) Date of Patent: Dec. 6, 2022

(54) AUTOMATIC TUNING OF MACHINE LEARNING PARAMETERS FOR NON-STATIONARY E-COMMERCE DATA

(71) Applicant: eBay Inc., San Jose, CA (US)

(72) Inventors: Tomer Lancewicki, Jersey City, NJ (US); Selcuk Kopru, San Jose, CA (US)

(73) Assignee: eBay Inc., San Jose, CA (US)

( * ) Notice: Subject to any disclaimer, the term of this patent is extended or adjusted under 35 U.S.C. 154(b) by 575 days.

(21) Appl. No.: 16/659,092

(22) Filed: Oct. 21, 2019

(65) Prior Publication Data
US 2021/0042811 A1 Feb. 11, 2021

Related U.S. Application Data

(63) Continuation of application No. 62/884,612, filed on Aug. 8, 2019.

(51) Int. Cl.
G06Q 30/06 (2012.01)
G06N 20/00 (2019.01)
(Continued)

(52) U.S. Cl.
CPC ......... G06Q 30/0631 (2013.01); G06F 17/16 (2013.01); G06F 40/58 (2020.01);
(Continued)

(58) Field of Classification Search
CPC ... G06N 3/0472; G06Q 30/06; G06Q 30/0603
See application file for complete search history.

(56) References Cited

U.S. PATENT DOCUMENTS

2004/0143600 A1* 7/2004 Musgrove ......... G06F 16/24575
2007/0078727 A1* 4/2007 Spiegel .............. G06Q 30/0631
705/26.7
(Continued)

FOREIGN PATENT DOCUMENTS

WO    WO-1997017663 A1 *  11/1995
WO    2019/083578 A1       5/2019
WO    WO-2019083578 A1 *   5/2019    ............. G06F 17/16

OTHER PUBLICATIONS

Kim, et al., "A Computationally Efficient Oracle Estimator for Additive Nonparametric Regression with Bootstrap Confidence Intervals," Journal of Computational and Graphical Statistics, 1998. (Year: 1998).*

(Continued)

Primary Examiner — Feng-Tzer Tzeng
(74) Attorney, Agent, or Firm — FIG. 1 Patents

(57) ABSTRACT

Techniques are disclosed for automatically adjusting machine learning parameters in an e-commerce system. Hyperparameters of a machine learning component are tuned using a gradient estimator and a first training set representative of an e-commerce context. The machine learning component is trained using the tuned hyperparameters and the first training set. The hyperparameters are automatically re-tuned using the gradient estimator and a second training set representative of a changed e-commerce context. The machine learning component is re-trained using the re-tuned hyperparameters and the second training set.

20 Claims, 11 Drawing Sheets

(51) Int. Cl.
*G06F 17/16* (2006.01)
*G06N 3/04* (2006.01)
*G06F 40/58* (2020.01)

(52) U.S. Cl.
CPC ......... *G06N 3/0445* (2013.01); *G06N 3/0454* (2013.01); *G06N 20/00* (2019.01); *G06N 3/0472* (2013.01); *G06Q 30/06* (2013.01); *G06Q 30/0603* (2013.01)

(56) References Cited

U.S. PATENT DOCUMENTS

2009/0271175 A1* 10/2009 Bodin ................. G06F 40/58
704/E21.001
2015/0269050 A1* 9/2015 Filimonov ............ G06N 20/10
702/183

OTHER PUBLICATIONS

Lancewicki et al., "Automatic and Simultaneous Adjustment of Learning Rate and Momentum for Stochastic Gradient Descent," Retrieved from Internet URL: https://arxiv.org/pdf/1908.07607.pdf, Aug. 20, 2019, 11 pages.

* cited by examiner

AUTOMATIC TUNING OF MACHINE LEARNING PARAMETERS FOR NON-STATIONARY E-COMMERCE DATA

PRIORITY APPLICATION

This application claims the benefit of and priority to U.S. Provisional Application No. 62/884,612, filed Aug. 8, 2019, the entire contents of which are incorporated herein by reference.

BACKGROUND

Machine learning is increasingly being utilized to perform a variety of tasks in e-commerce environments where patterns and inferences may be used in place of explicit programming. Machine learning systems may be trained using sample data to make predictions or decisions. In order to training machine learning systems, various parameters need to be adjusted to enable the system to make useful decisions based on the input data. In particular, hyperparameters need to be adjusted to enable the system to make relevant decisions based on current input data. Adjustment of the hyperparameters require manual adjustment based on trial and error.

It is with respect to these and other technical considerations that the disclosure made herein is presented.

SUMMARY

Machine learning may be utilized to perform a variety of tasks in e-commerce environments. For example, machine learning can be used to provide inventory matching using image and text recognition, machine translations of product descriptions, real time assessment of external factors to generate customer incentives, generation of personalization/recommendations for users, and detect anomalies. However, the adjustment of parameters required to train machine learning systems is a costly and computationally expensive process. Stochastic Gradient Descent (SGD) is one method for training machine learning and deep learning models. However, its performance depends on tuning the hyperparameters and retraining the system as the input data changes. Manual adjustment of hyperparameters is very costly and time-consuming. Even when done correctly, it lacks theoretical justification which may lead to "rule of thumb" settings.

This can be a particular challenge in the e-commerce context as the input data is changing at variable and unpredictable rates. For example, the number of active buyers for a given item may change rapidly, the number and type of items may change due to external market conditions, the e-commerce system may reconfigure item categories, seasonal changes may change the type and quantity of inventory, and rules that impact the e-commerce chain may change locally or globally.

If the machine learning model is not able to respond rapidly to such varied and unpredictable changes, the model may return inaccurate results. The present disclosure describes various methods for utilizing the statistics of an unbiased gradient estimator to automatically and simultaneously adjust hyperparameters in an e-commerce environment. In one embodiment, the unbiased gradient estimator is used to automatically and simultaneously adjust the learning rate and momentum, being adaptive to the non-stationary data in e-commerce markets. The disclosed techniques may be used, for example, in the training of convolutional neural networks (CNN's). By automatically converging on an optimal setting for such hyperparameters as the input data changes, the machine learning model be continuously updated to provide relevant results in the face of continuously changing input data.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

Figure 1:
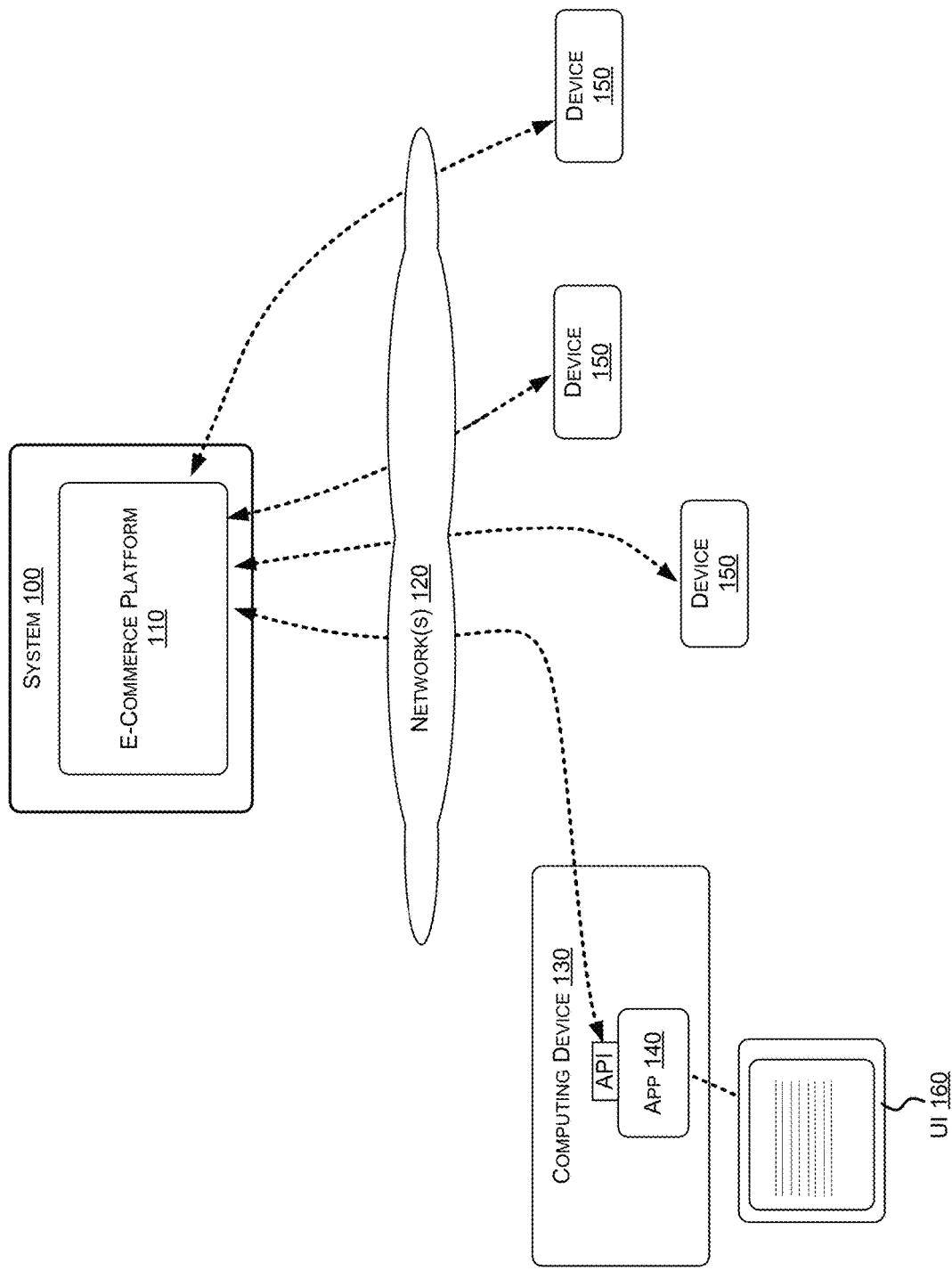
FIG. 1 is a diagram showing aspects of an example system according to one embodiment disclosed herein.

The following Detailed Description presents technologies for automatically and simultaneously adjust hyperparameters in a machine learning system. In various embodiments, methods and systems are disclosed for utilizing the statistics of an unbiased gradient estimator to automatically and simultaneously adjust hyperparameters in an e-commerce environment. In one embodiment, the unbiased gradient estimator is used to automatically and simultaneously adjust the learning rate and momentum, being adaptive to the non-stationary data in e-commerce markets.

The adjustment of parameters required to train machine learning systems is typically a costly and computationally expensive process. Stochastic gradient descent (SGD) is one method for training machine learning and deep learning models. However, its performance depends on tuning the hyperparameters and retraining the system as the input data changes. The process of adjusting of hyperparameters is very costly and time-consuming. Even when done correctly, it lacks theoretical justification which may lead to "rule of thumb" settings.

This can be a particular challenge in the e-commerce context as the input data is changing at variable and unpredictable rates. For example, the number of active buyers for a given item may change rapidly, the number and type of items may change due to external market conditions, the e-commerce system may reconfigure item categories, seasonal changes may change the type and quantity of inventory, and rules that impact the e-commerce chain may change locally or globally.

If the machine learning model is not able to respond rapidly to such varied and unpredictable changes, the model may return inaccurate results. By automatically converging on an optimal setting for such hyperparameters as the input data changes, the machine learning model be continuously updated to provide relevant results in the face of continuously changing input data.

The disclosed technologies can enhance the functionality and efficiency of various machine learning systems and related applications. As just one example, by reducing the amount of computation required to optimize such parameters and train a system, the use of computing resources can be improved. Technical benefits other than those specifically mentioned herein might also be realized through implementations of the disclosed technologies.

It is to be appreciated that while the technologies disclosed herein are primarily described in the context of optimization of momentum and learning rate, the technologies described herein can be utilized to optimize other parameters in other contexts, which will be apparent to those of skill in the art.

Referring to the appended drawings, in which like numerals represent like elements throughout the several FIGURES, aspects of various technologies for test conduct and monitoring will be described. In the following detailed description, references are made to the accompanying drawings that form a part hereof, and which are shown by way of illustration specific configurations or examples.

The disclosed techniques are described in the context of optimizing selection of the learning rate and momentum, the described techniques can be applied more generally to optimizing functions that uses a Hessian and gradient, as well as various architectures and applications.

Accordingly, the disclosed techniques can be used for optimizers such as:
Gauss Newton
Nesterov accelerated gradient
Adadelta
RMSprop
AdaMax
Nadam
AMSGrad In some embodiments, the disclosed methods may be used in conjunction with methods for improving the performance of SGD by parallelizing and distributing SGD. Additional strategies for optimizing SGD may include shuffling (shuffling the training data to avoid biasing) and curriculum learning (inputting the training examples in a predetermined order), batch normalization (e.g., reestablishing normalizations for each mini-batch), early stopping based on error monitoring, and adding gradient noise.

The described techniques may allow for the automatic adaptation of the learning rate and momentum as the data changes, thus avoiding the need to retune the parameters when the input data changes.

The disclosed techniques can further be applied in various architectures such as:
convolutional neural networks (CNNs)
recurrent neural networks (RNNs)
long-short term memory networks (LSTMs)
gated recurrent units (GRUs)
Hopfield networks (HN)
Boltzmann machines
deep belief networks
autoencoders
generative adversarial networks (GANs).

The disclosed techniques may be applied to optimization of other hyperparameters besides learning rate and momentum. For example, the mini-batch size may be optimized to determine an optimal size where increasing the size does not improve performance. For example, as the variance of the gradient is determined given the Hessian, the mini-batch size can be limited to where the variance approaches a predetermined limit.

Other hyperparameters that may be optimized include regularization, the number of epochs, the number of hidden units, and the number of layers.

The disclosed techniques can provide improved performance of the application of deep learning methods to a number of applications including automatic speech recognition, image recognition, visual art processing, natural language processing, recommendation systems, and fraud detection.

E-commerce systems may utilize machine learning to perform a variety of tasks. For example, machine learning can be used to provide inventory matching using image and text recognition of products and other inventory. Machine learning can be used to generate machine translations of product descriptions and other text. This may be useful in a global context where product descriptions need to be provided in multiple languages. Machine learning can also be used to provide real time assessment of external factors to generate customer incentives as well as personalizations and recommendations for users that incentivize product fulfillment. External factors may include incentives that are initiated by competitors, new product releases, and data pertaining to the number of active users who are interacting with the e-commerce system. converting users into active buyers. Finally, machine learning can be used to detect anomalies and outliers in the observed data.

The training of machine learning systems can be a particular challenge in the e-commerce context as the input data is changing at variable and unpredictable rates. For example, the number and type of active buyers for a given item may continuously change. Users may move locations, enter different life stages, general demographic patterns may change. Additionally, the number and type of items may change due to external market conditions. New product lines may be announced, user interest and markets may continuously shift, Seasonal changes such as holiday seasons and national or global campaigns may result in large scale changes in e-commerce activity. The e-commerce system itself may introduce changes, for example when item categorization regimes are updated. Finally, rules and laws may change that impact the e-commerce chain on a local or global scale, such as tax rules, the legal age for purchasing certain classes of products, or allowing the e-commerce system to enter an entirely new geographic area.

These and other conditions may result in changes to the data that is monitored by machine learning systems in the e-commerce context. The changes can be manifested in the types and names of inventory, item categories, language and vocabulary, data indicative of user behaviors, and the like. The machine learning system should be able to continuously learn new patterns and generate outputs while minimizing output errors.

The present disclosure describes various methods for utilizing the statistics of an unbiased gradient estimator to automatically and simultaneously adjust hyperparameters in the e-commerce environment. By automatically converging on an optimal setting for such hyperparameters as the input data changes, the machine learning model be continuously updated to provide relevant results in the face of continuously changing input data.

In the example system illustrated in FIG. 1, a system 100 is illustrated that implements e-commerce platform 110. The e-commerce platform 110 may be configured to provide product information to various devices 150 over a network 120, as well as computing device 130. A user interface 160 may be rendered on computing device 130. The user interface 160 may be provided in conjunction with an application 140 that communicates to the e-commerce platform 110 using an API via network 120. In some embodiments, system 100 may be configured to provide product information to users. In one example, e-commerce platform 110 may implement a machine learning system to perform one or more tasks. The e-commerce platform 110 utilize the machine learning system to perform tasks such as inventory matching, generate translations of product descriptions, assess external factors to generate customer incentives, generate personalization/recommendations for users, and detect anomalies. The machine learning system may be configured to be adaptive to non-stationary data received from computing device 130 and various devices 150.

Figure 2:
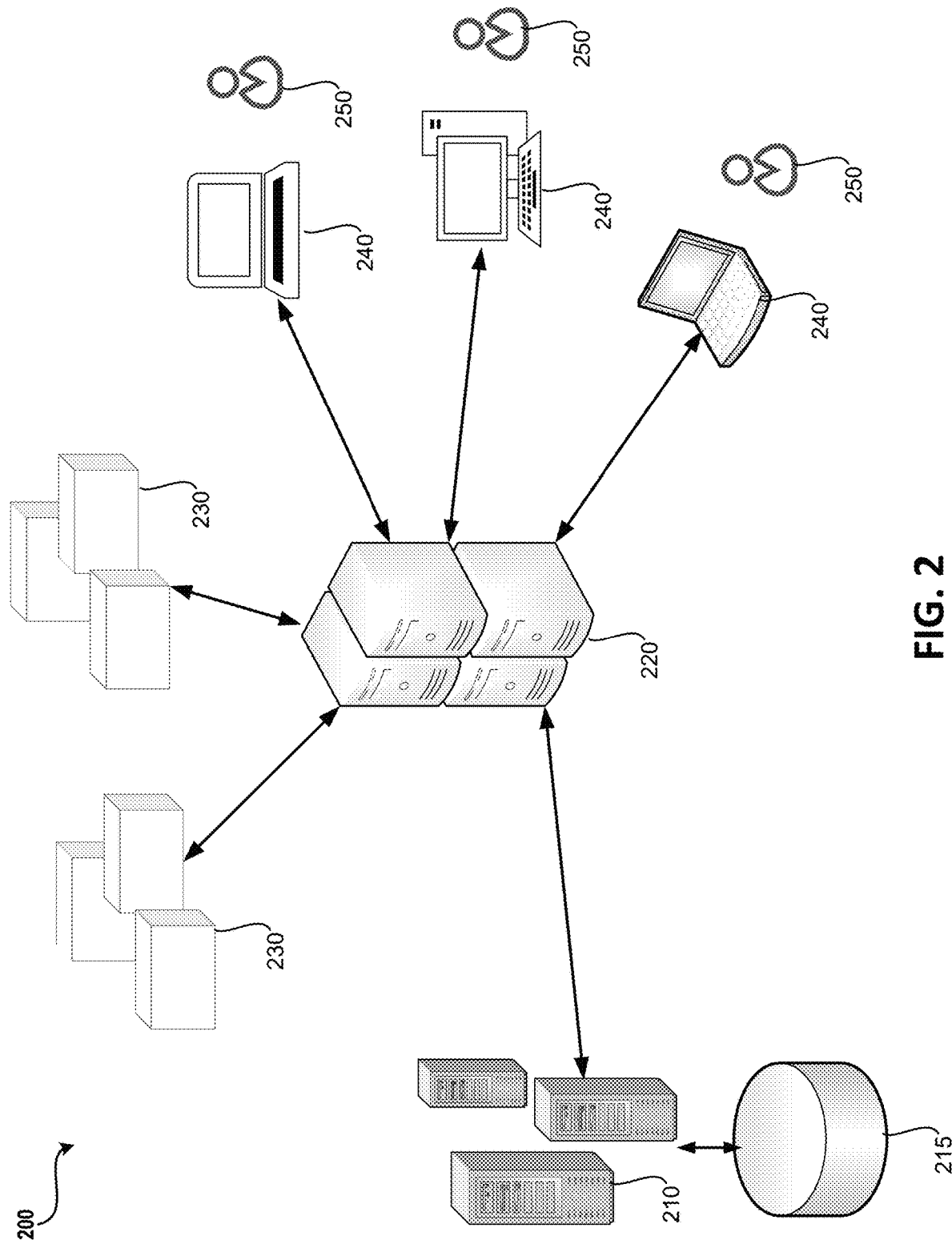
FIG. 2 is a diagram showing aspects of an example system according to one embodiment disclosed herein.

FIG. 2 illustrates a block diagram showing an example environment where a platform such as e-commerce platform 110 may be implemented. FIG. 2 illustrates a machine learning environment 200 that may include servers 210 machine learning environment 200. The servers 210 may comprise one or more servers, which may collectively referred to as "server." The machine learning environment 200 may further include a database 215, which may be configured to store various information used by the server 210 including product data, user data, and the like. The machine learning environment 200 may further include communications server 220, which, for example, enables network communication between the server 210, online servers 230, and client devices 240. The client devices 240 may be any type of computing device that may be used by users 250 to connect with the server 210 over a communications network. Users 250 may be, for example, users who are accessing services provided by communications server 220 and/or online servers 230. The servers 230 may be operated by any party that is involved in providing, for example, online services. For example, the servers 230 may be configured to implement auction sites or online transactions. Accordingly, the servers 230 may be any type of computing device described herein as may be operated by an auction broker, a financial institution, and the like. The servers and devices represented in FIG. 2 communicate via various network communications hardware and software to facilitate the collection and exchange of data for use in a networked environment.

Some aspects of machine learning are formulated as the minimization of a loss function that depends on a training set. An optimization problem that frequently appears in machine learning is the minimization of the average of loss functions over a finite training set, i.e., $$\bar{F}(w) = \frac{1}{M}\sum_{i=1}^{M} f(w;\bar{x}_i),$$

where $\bar{x}_i \in \mathbb{R}^d$ is the i-th observation in the training set $\{\bar{x}_i\}_{i=1}^{M}$ of size M, the function $f(w;\bar{x}_i): \mathbb{R}^d \to \mathbb{R}$
is the loss corresponding to $\bar{x}_i$, and $w \in \mathbb{R}^P$ is the weight vector. Starting with an initial guess for the weight vector w, stochastic gradient descent (SGD) methods attempt to minimize the loss function F(w) by iteratively updating the values of w. Each iteration utilizes a sample $$\{x_i\}_{i=1}^{N}$$

of size N, commonly called a "mini-batch", which is taken randomly from the training set $$\{\bar{x}_i\}_{i=1}^{M}$$

The update from $w_t$ to $w_{t+1}$ at the t-th iteration relies on a gradient estimator, which in turn depends on the current mini-batch. The typical unbiased gradient estimator of the unknown true gradient is defined by $$g_t = \frac{1}{N}\sum_{i=1}^{N}\frac{\partial f(w;x_i)}{\partial w}\Big|_{w=w_t} = \frac{1}{N}\sum_{i=1}^{N} g_t^{(i)},$$

where $g_t^{(i)}$ is the gradient produced by the i-th observation within the current mini-batch of size N. The gradient estimator $g_t$ entails variance, since it depends on a random set of observations. If the variance of $g_t$ is large, the SGD method may have difficulty converging and perform poorly. Indeed, the variance may be reduced by increasing the mini-batch size N. However, this increases the computational cost of each iteration. Some methods may attempt to reduce the variance of the gradient estimator, and while these methods provide unbiased gradient estimators, they are not necessarily optimal in the sense of mean-squared error (MSE) which allows reducing the variance with the cost of bias. Momentum-based methods may trade off between variance and bias by constructing the gradient estimator as a combination of the current unbiased gradient estimator and previous gradient estimators. Other methods may use biased estimators by scaling the gradient with square roots of exponential moving averages of past squared gradients. These methods include, for example, AdaGrad, Adam, AdaDelta, NAdam, etc. The main drawback of these methods is their reliance on one or more hyperparameters, i.e., parameters which must be tuned in advance to obtain adequate performance. Unfortunately, manual hyperparameter tuning can be very costly, as every hyperparameter configuration is typically tested over many iterations.

Figure 3:
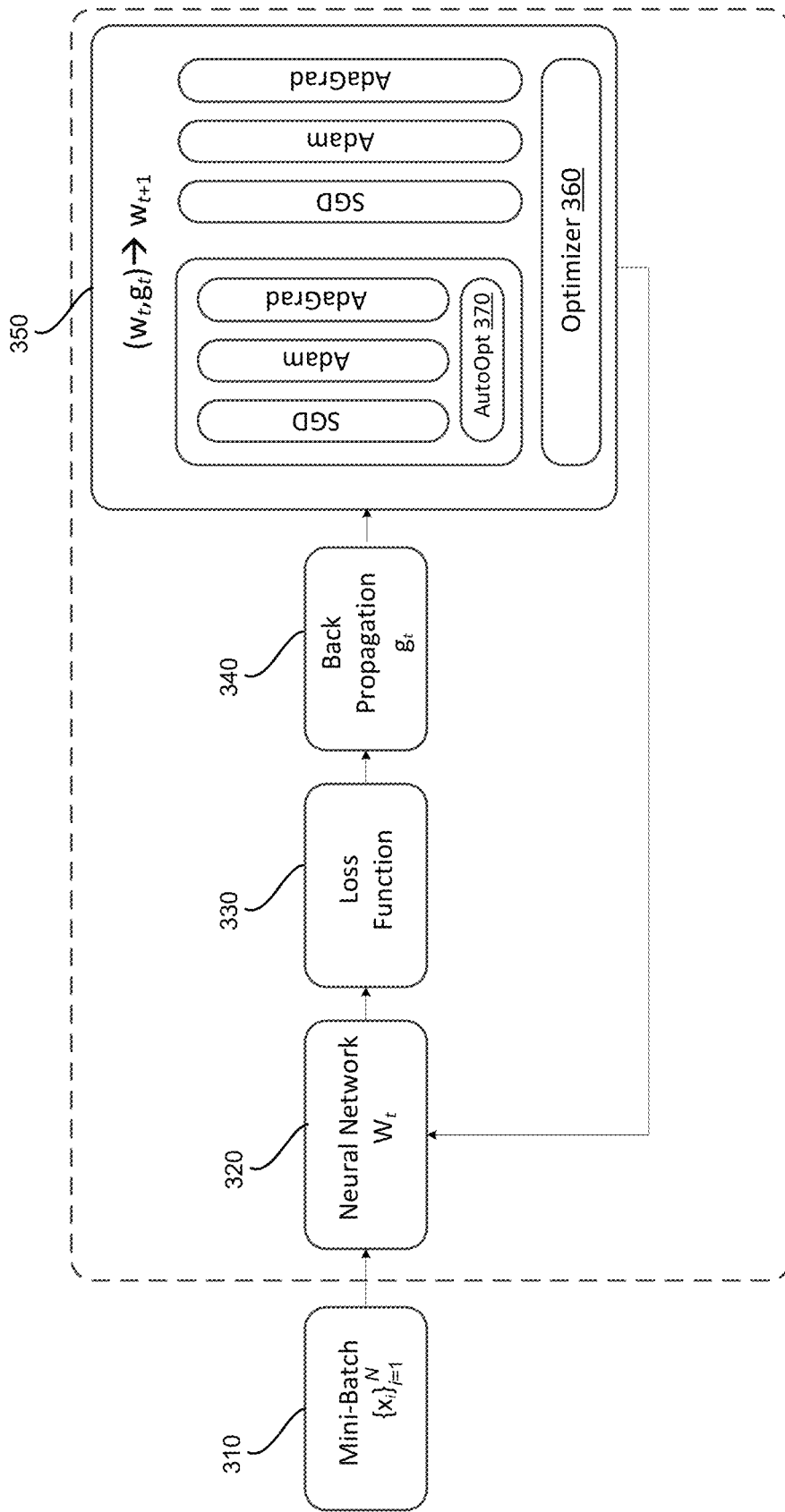
FIG. 3 is a system diagram illustrating one embodiment disclosed herein.

In various embodiments, techniques are described to automatically and simultaneously adjust the learning rate and the momentum hyperparameters, to minimize (or maximally decrease) the expected loss after the next update. FIG. 3 illustrates the method as applied to the SGD, Adam and AdaGrad optimizers. A mini-batch 310 may be input to a neural network 320. The loss function 330 may be minimized by iteratively updating the values using back propagation 340. An optimizer 360 includes an AutoOpt component 370 that implements one or more of the techniques described herein.

In some embodiments, the disclosed method may be implemented in deep learning architectures and convolutional neural networks (CNN's). While the examples provided herein are described using learning rate and momentum parameters, it should be understood that the described techniques may be used to optimize other parameters. The optimal values may relate to the unknown true gradient, which may be unattainable in practice and referred to as the "oracle" solution. Nevertheless, the oracle solution can be estimated and thus feasible for practical implementations. While examples are described using SGD, Adam, and AdaGrad classifiers, other CNN-based and other classifiers may be used as well.

Figure 4:
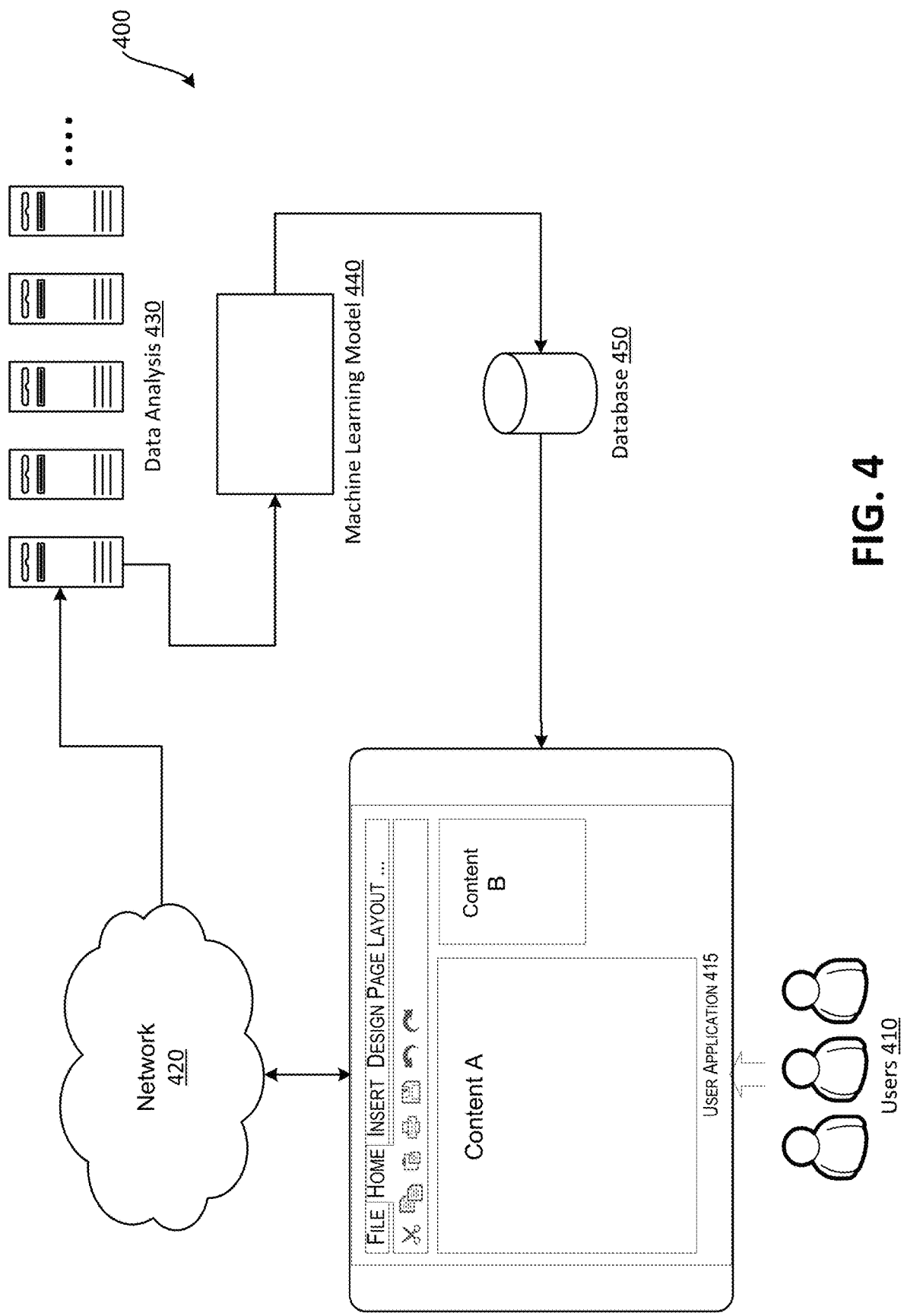
FIG. 4 is a diagram showing aspects of an example system according to one embodiment disclosed herein.

FIG. 4 is a computing system architecture diagram showing an overview of a system disclosed herein for implementing a machine learning model, according to one embodiment disclosed herein. As shown in FIG. 4, a machine learning system 400 may be configured to perform analysis and perform identification, prediction, or other functions based upon various data collected by and processed by data analysis components 430 (which might be referred to individually as an "data analysis component 430" or collectively as the "data analysis components 430"). The data analysis components 430 may, for example, include, but are not limited to, physical computing devices such as server computers or other types of hosts, associated hardware components (e.g. memory and mass storage devices), and networking components (e.g. routers, switches, and cables). The data analysis components 430 can also include software, such as operating systems, applications, and containers, network services, virtual components, such as virtual disks, virtual networks, and virtual machines. The database 450 can include data, such as a database, or a database shard (i.e. a partition of a database). Feedback may be used to further update various parameters that are used by machine learning model 420. Data may be provided to the user application 400 to provide results to various users 410 using a user application 415. In some configurations, machine learning model 420 may be configured to utilize supervised and/or unsupervised machine learning technologies.

Figure 5:
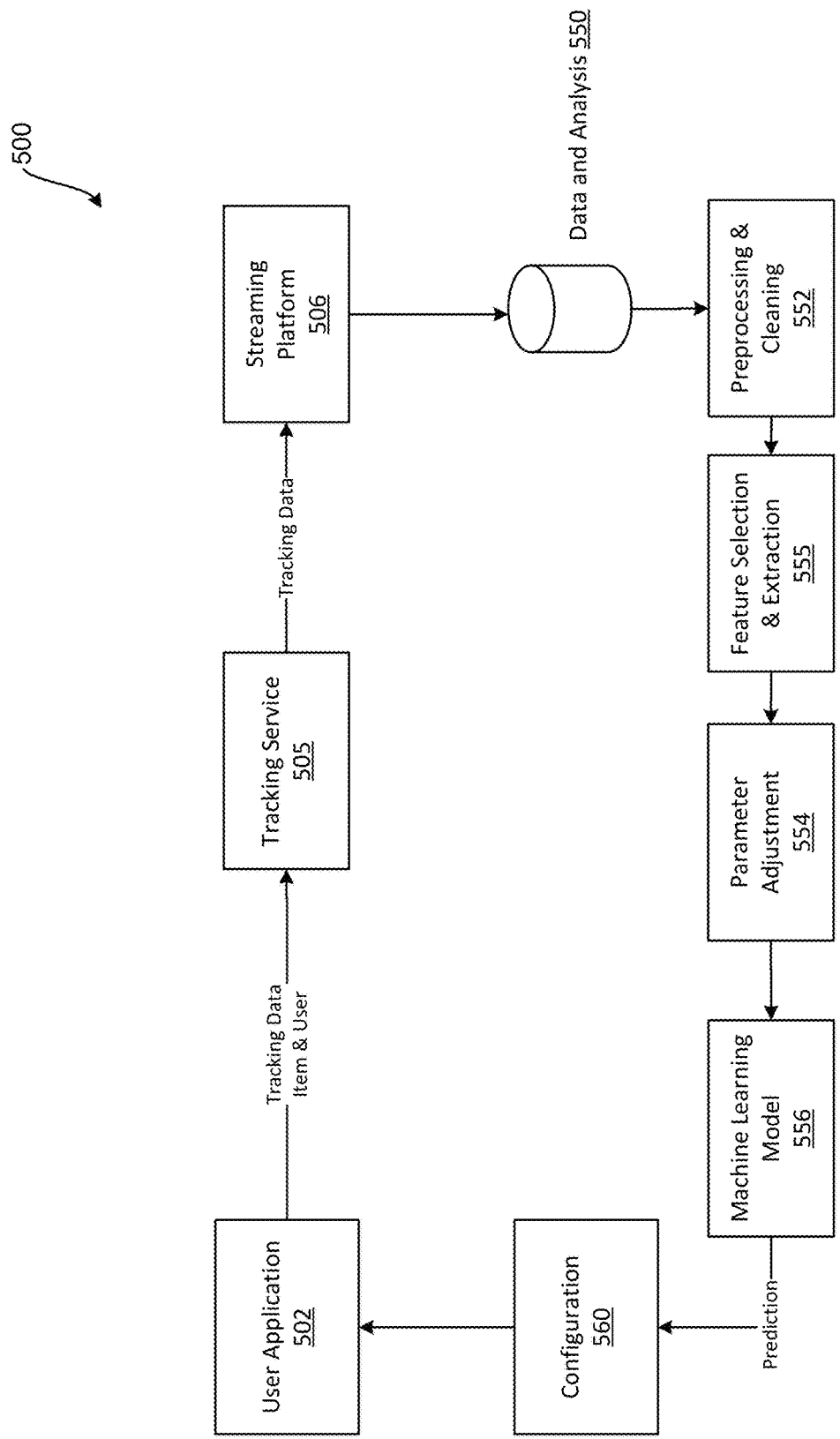
FIG. 5 is a system diagram illustrating one embodiment disclosed herein.

FIG. 5 is a computing system architecture diagram showing an overview of a system disclosed herein for a system that implements a machine learning system in an e-commerce environment, according to one embodiment. As shown in FIG. 5, an e-commerce platform 500 may be configured to perform tasks based upon tracking data generated by tracking service 505 and received from user application 502.

The tracking service 505 may send selected tracking data to a streaming platform 506. Such a streaming platform may be implemented using a Kafka pipeline, in one implementation. Data streams may be provided to a data storage component and analysis component 550 that may, for example, include Hadoop utilities. The data and analysis component 550 may provide data for a preprocessing and cleaning component 552 that may be configured to process the stored data. The processed data may be provided to a feature selection and extraction component 555 that may be configured to select data and properties for a given item, user, and the like. The processed data may be provided to a parameter adjustment component 554 that may adjust one or more parameters such as the learning rate and momentum. The adjusted parameters may be provided to machine learning model 556 that may use the data and properties to generate predictions or other outputs and send the outputs to configuration system 560. In some embodiments, the configuration system 560 may be implemented as a distributed key-value database such as Redis.

In some configurations, the machine learning model 556 may be configured to utilize supervised and/or unsupervised machine learning technologies to perform machine learning tasks. For example, the machine learning model 556 may utilize supervised machine learning techniques by training on tracking data that describes various user data as described herein. The machine learning model 556 can generate predictions based on features extracted from the user information.

In the present disclosure, vectors are shown in lowercase boldface letters and matrices in uppercase boldface. The transpose operator and the diagonal operator are denoted by $(.)^T$ and diag $(.)$, respectively. The column vector of p ones is denoted by $1_p = [1, 1, \ldots, 1]^T$ and the expectation operator is denoted by $E\{.\}$.

The theoretical scenario of an unlimited training set is now described. Suppose that the observations within the training set $$\{\bar{x}_i\}_{i=1}^M$$

are independent identically distributed (i.i.d), drawn from a probability density function P(x). In the ideal case of an unlimited amount of training examples, the loss function $\bar{F}(w)$ approaches the real unknown loss function, defined as $$J(w) = \lim_{M \to \infty} \frac{1}{M} \sum_{i=1}^{M} f(w; \bar{x}_i) = \int f(w; x) \mathcal{P}(x) dx.$$

The loss function J(w) is deterministic, and assumed to be continuously differentiable with respect to the weight vector w. Starting with an initial guess $w_0$, we would like to generate a sequence of weights $w_t$, $t=1, \ldots, T$ such that the loss function J(w) is reduced at each iteration of the algorithm, i.e., $$J(w_{t+1}) < J(w_t).$$

The loss function J(w) can be approximated by a second-order (i.e., quadratic) Taylor series expansion around $w_t$, i.e., $$J(w) \approx \hat{J}(w) = J(w_t) + (w - w_t)^T \bar{g}_t + \frac{1}{2}(w - w_t)^T \bar{H}_t (w - w_t),$$

where $$\bar{g}_t = \frac{\partial J(w)}{\partial w}\bigg|_{w=w_t}$$

and $$\bar{H}_t = \frac{\partial^2 J(w)}{\partial w^2}\bigg|_{w=w_t}$$

are the gradient vector and the Hessian matrix of the loss function J(w), evaluated at $w_t$. By deriving $$\hat{J}(w)$$

with respect to w and setting the result to zero, we find that the next weight vector $w_{t+1}$ which minimizes $$\hat{J}(w)$$

is given by $$w_{t+1} = w_t + \overline{H}_t^{-1} \overline{g}_t.$$

The iterative equation above is also known as the Newton-Raphson method. In practice, at time t, only a finite sample (the current mini-batch) of size N is available. As a result, neither the gradient vector $\overline{g}_t$, nor the Hessian matrix $\overline{H}_t$ (and its inverse) required above are known. To practically apply the update rule for $w_{t+1}$, both quantities $\overline{g}_t$ and $\overline{H}_t$, must be replaced by their estimators, denoted as $\hat{g}_t$ and $\hat{H}_t$, respectively. The use of the estimators $\hat{g}_t$ and $\hat{H}_t$ (instead of $\overline{g}_t$ and $\overline{H}_t$) leads to the general update rule of SGD methods given by $$w_{t+1} = w_t - \hat{H}_t^{-1} \hat{g}_t.$$

The discussion regarding the gradient estimator $\hat{g}_t$ above may refer to the model $$\hat{g}_t = +((1-\beta)g_t + \beta \hat{g}_{t-1}),$$

where $g_t$ is the unbiased estimator of the unknown true gradient $\overline{g}_t$ (i.e., $E\{g_t\} = \overline{g}_t$), $\beta$ is the momentum parameter which is a scalar between 0 and 1, and $\alpha$ is the learning rate, a positive scalar which ensures that the update rule does not produce a weight vector $w_{t+1}$ with an implausible large norm. The inverse of the estimated Hessian matrix $\hat{H}_t^{-1}$ is not easy to compute. There are various methods to estimate the inverse of the Hessian matrix, such as Broyden-Fletcher-Goldfarb-Shanno (BFGS) quasi-Newton based methods. However, if computational simplicity is of paramount importance, then it is common to assume that $\hat{H}_t^{-1}$ is equal to the identity matrix I. In the present disclosure that case may be referred to as the classic SGD. The Adam optimizer assumes a diagonal Hessian matrix estimator of the form $$\hat{H}_t = (1 - \beta^t) \mathrm{diag}\left( \sqrt{\frac{(1-\beta_2)g_t^2 + \beta_2 \hat{g}_{t-1}^2}{1 - \beta_2^t}} + \epsilon 1_p \right).$$

The AdaGrad method, which corresponds to a version of Adam, utilizes the gradient estimator $\hat{g}_t$ with momentum $\beta = 0$, and a diagonal Hessian matrix estimator of the form $$\hat{H}_t = \mathrm{diag}\left( \sqrt{\sum_{i=1}^{t} g_i^2} + \epsilon 1_p \right).$$

Such methods propose different gradient and Hessian estimators, to be plugged into the update rule above, and are summarized in Table 1:

| METHOD | GRADIENT | HESSIAN |
| --- | --- | --- |
| SGD | $\hat{g}_t$ (10), $\beta = 0$ | I |
| SGD + MOMENTUM | $\hat{g}_t$ (10) | I |
| ADAM | $\hat{g}_t$ (10) | $\hat{H}_t$ (11) |
| ADAGRAD | $\hat{g}_t$ (10), $\beta = 0$ | $\hat{H}_t$ (12) |

SGD methods that follow the general update rule along with their gradient and Hessian estimators are shown in Table 1. These optimizers share the same gradient estimator model $\hat{g}_t$, with or without momentum, while utilizing different Hessian estimators.

The disclosed techniques may be used to determine the optimal values of $\alpha$ and $\beta$ at time t, which minimize the expected value of the loss function $\hat{J}(w)$ when using the update rule, i.e., $$\alpha_{Ot}, \beta_{Ot} = \arg\min_{\alpha,\beta}(E\{\hat{J}(w_{t+1}; \alpha, \beta)\}).$$

As the above equation may be solved for the general update rule, the disclosed techniques may be used in any SGD method that utilizes the gradient estimator $\hat{g}_t$.

The optimal learning rate and momentum as defined above may be derived. By changing variables such that $\alpha = 1 - \gamma_1$ and $$\beta = \frac{\gamma_2}{1 - \gamma_1},$$

we can rewrite the gradient estimator $\hat{g}_t$ as $$\hat{g}_t = (1 - \gamma_1 - \gamma_2)g_t + \gamma_2 \hat{g}_{t-1} = g_t - G_t \gamma,$$

where $G_t$ is a p×2 matrix defined as $$G_t = [g_t, g_t - \hat{g}_{t-1}],$$

and $$\gamma = [\gamma_1, \gamma_2]^T$$

is a 2×1 vector. Then, by substituting the update rule $w_{t+1}$ for w in the loss function while using the gradient estimator $\hat{g}_t$, we can rewrite the expected value of the loss function as $$E\{J(w_{t+1}; \gamma)\} \approx E\{\hat{J}(w_{t+1}; \gamma)\} = J(w_t) - \hat{g}_t^T E\{\hat{H}_t^{-1} g_t\} + \tfrac{1}{2} E\{g_t^T \hat{H}_t^{-1} \overline{H}_t \hat{H}_t^{-1} g_t\} - \gamma^T b_t + \tfrac{1}{2} \gamma^T A_t \gamma,$$

where $$A_t = E\{G_t^T \hat{H}_t^{-1} G_t\}$$

and $$b_t = E\{G_t^T \hat{H}_t^{-1}((g_t - \overline{g}_t) + (\overline{H}_t \hat{H}_t^{-1} - I)g_t)\}.$$

The matrix $A_t$ and the vector $b_t$ are of size 2×2 and 2×1, respectively. The optimal vector $\gamma$ at time t, which we denote by $\gamma_{Ot} = [\gamma_1^{Ot}, \gamma_2^{Ot}]^T$, is the solution that minimizes the loss function $E\{\hat{J}(w_{t+1}; \gamma)\}$, i.e., $$\gamma_{Ot} = \arg\min_\gamma(E\{\hat{J}(w_{t+1}; \gamma)\}) = A_t^{-1} b_t.$$

Since $\gamma_{Ot}$ depends on the true gradient $\overline{g}_t$, which is unknown in practice, it may be referred to as the oracle solution. The present disclosure describes an estimator for the oracle solution $\gamma_{Ot}$.

The oracle vector $\gamma_{Ot}$ minimizes the loss function $E\{\hat{J}(w_{t+1}; \gamma)\}$, but unfortunately depends on the unknown quantities $A_t$ and $b_t$. Consider first the perplexing vector $b_t$ which depends on the unknown gradient $\overline{g}_t$ and the Hessian matrix $\overline{H}_t$. With the aim of proceeding toward a practical method, we unfold the tangled equation by assuming that the Hessian is known, i.e., $\hat{H}_t = \overline{H}_t$, and provided by the optimizer currently in use (see Table 1). As a result, the vector $b_t$ can be simplified (after a few mathematical manipulations) to $$b_t = 1_2 V(g_t | \hat{H}_t),$$

where $$V(g_t|\hat{H}_t)=E\{(g_t-\bar{g}_t)^T\hat{H}_t^{-1}(g_t-\bar{g}_t)\}.$$

The scalar $$V(g_t|\hat{H}_t)$$

still depends on the unknown true gradient $\bar{g}_t$, however, can be estimated. The derivation of an unbiased estimator of $$V(g_t|\hat{H}_t)$$

appears in Appendix A, and is equal to $$\hat{V}(g_t|\hat{H}_t) = \frac{\sum_{i=1}^{N}(g_t^{(i)}-g_t)^T\hat{H}_t^{-1}(g_t^{(i)}-g_t)}{N(N-1)},$$

where $g_t^{(i)}$ is the gradient produced by the i-th observation within the current mini-batch of size N. The estimator of $b_t$ is therefore $$\hat{b}_t = 1_2 \hat{V}(g_t|\hat{H}_t).$$

The estimator of $A_t$ is calculated by replacing all expectations in $A_t$ by their sample counterparts, i.e., $$\hat{A}_t = G_t^T \hat{H}_t^{-1} G_t.$$

Finally, by incorporating the estimators $\hat{b}_t$ and $\hat{A}_t$, the oracle solution $\gamma_{Ot}$ is estimated by $$\hat{\gamma}_{Ot} = \hat{A}_t^{-1} \hat{b}_t.$$

Consider that the values of $\hat{\gamma}_{Ot}$ varies based on the current mini-batch at time t, we mitigate this effect by using an exponentially weighted moving average model $\hat{\gamma}_{Et}$, defined as $\hat{\gamma}_{Et}=(1-\upsilon)\hat{\gamma}_{Ot}+\upsilon\hat{\gamma}_{E(t-1)}$.

One summary of the disclosed method for an automatic and simultaneous adjustment of the learning rate and momentum may be described by Algorithm 1:

---

Algorithm 1 AutoOpt: Automatic and Simultaneous
Adjustment of Learning Rate and Momentum

---

Input:
1) Loss function F (w) (1) with an initial weight vector $w_0$
2) Optimizer, based on the update rule (9). (e.g., Table 1).
for t = 1,...,T:
    1.    Calculate the oracle estimator $\hat{\gamma}_{Ot}$ (25)
    2.    Update $\hat{\gamma}_{Et}$ (26) using $\hat{\gamma}_{Ot}$ (25)
    3.    Calculate the gradient estimator $\hat{g}_t$ (14) with $\hat{\gamma}_{Et}$ (26)
    4.    Update the weight vector $w_t$ according to
        $w_{t+1} = w_t - \hat{H}_t^{-1}\hat{g}_t$ (9), using the gradient estimator $\hat{g}_t$ (14).
return $w_T$

---

The vector $\hat{\gamma}_{Et}$ may be computed in each step with a time-complexity that is equal or better than the time-complexity of the back-propagation algorithm (see Appendix B), therefore making the method feasible for practical use in deep learning architectures.

Figure 6:
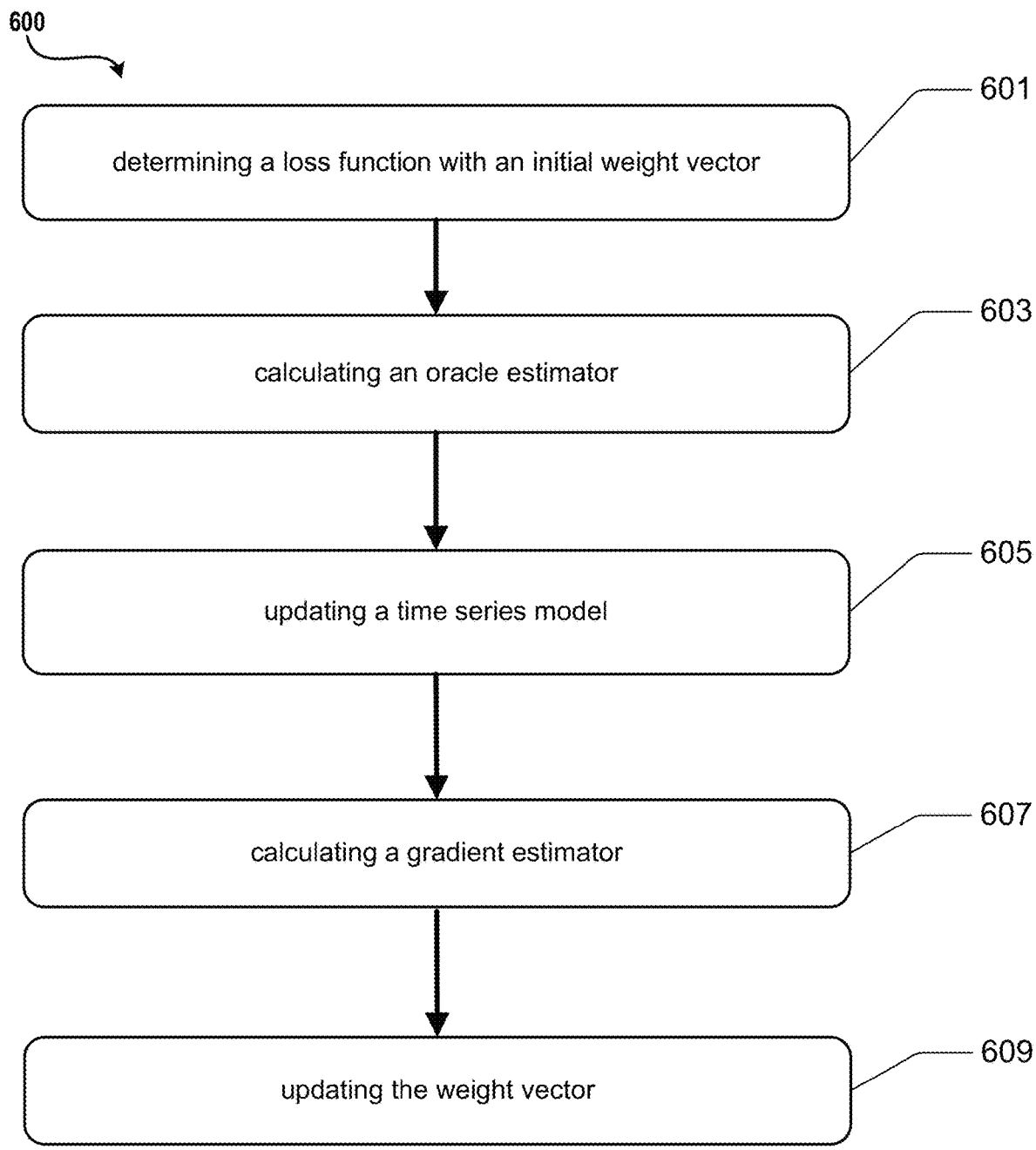
FIG. 6 is a flow diagram showing aspects of an illustrative routine, according to one embodiment disclosed herein.

FIG. 6 is a diagram illustrating aspects of a routine 600 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The routine 600 begins at operation 601, which illustrates determining a loss function with an initial weight vector.

The routine 600 then proceeds to operation 603, which illustrates based on an update rule, calculating an oracle estimator.

Operation 605 illustrates updating a time series model based on the oracle estimator. In some embodiments, the time series model may be an exponentially weighted moving average model. Other time series models may be implemented in other embodiments.

Next, operation 607 illustrates calculating a gradient estimator using the time series model.

Operation 609 illustrates updating the weight vector using the gradient estimator.

Figure 7:
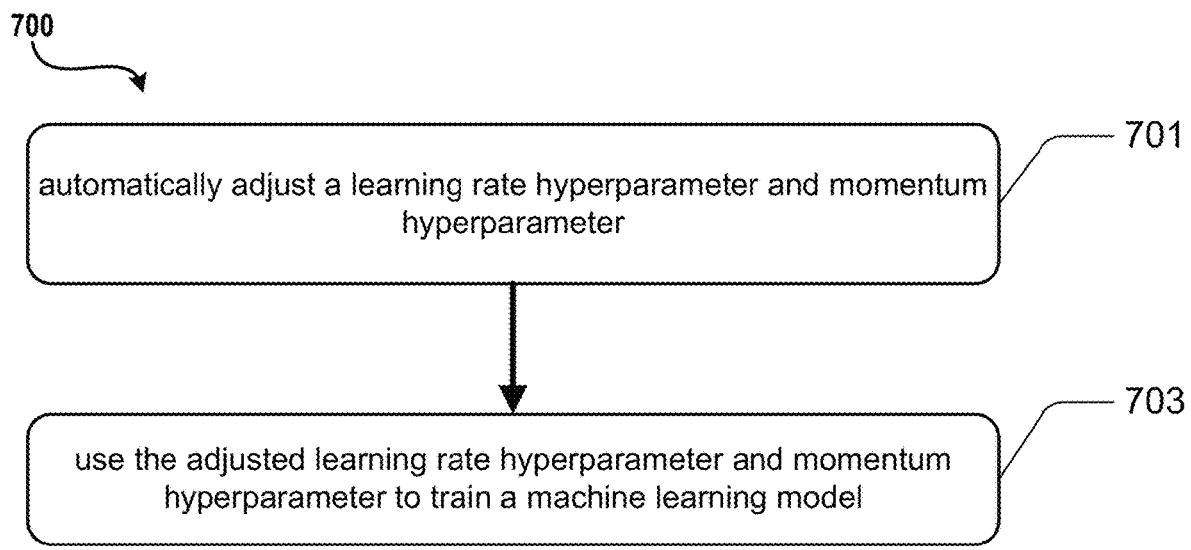
FIG. 7 is a flow diagram showing aspects of an illustrative routine, according to one embodiment disclosed herein.

FIG. 7 is a diagram illustrating aspects of a routine 700 for implementing some of the techniques disclosed herein.

The routine 700 begins at operation 701, which illustrates automatically adjusting a learning rate hyperparameter and momentum hyperparameter to maximally decrease an expected loss after an update to a weight vector.

The routine 700 then proceeds to operation 703, which illustrates using the adjusted learning rate hyperparameter and momentum hyperparameter to train a machine learning model.

Figure 8:
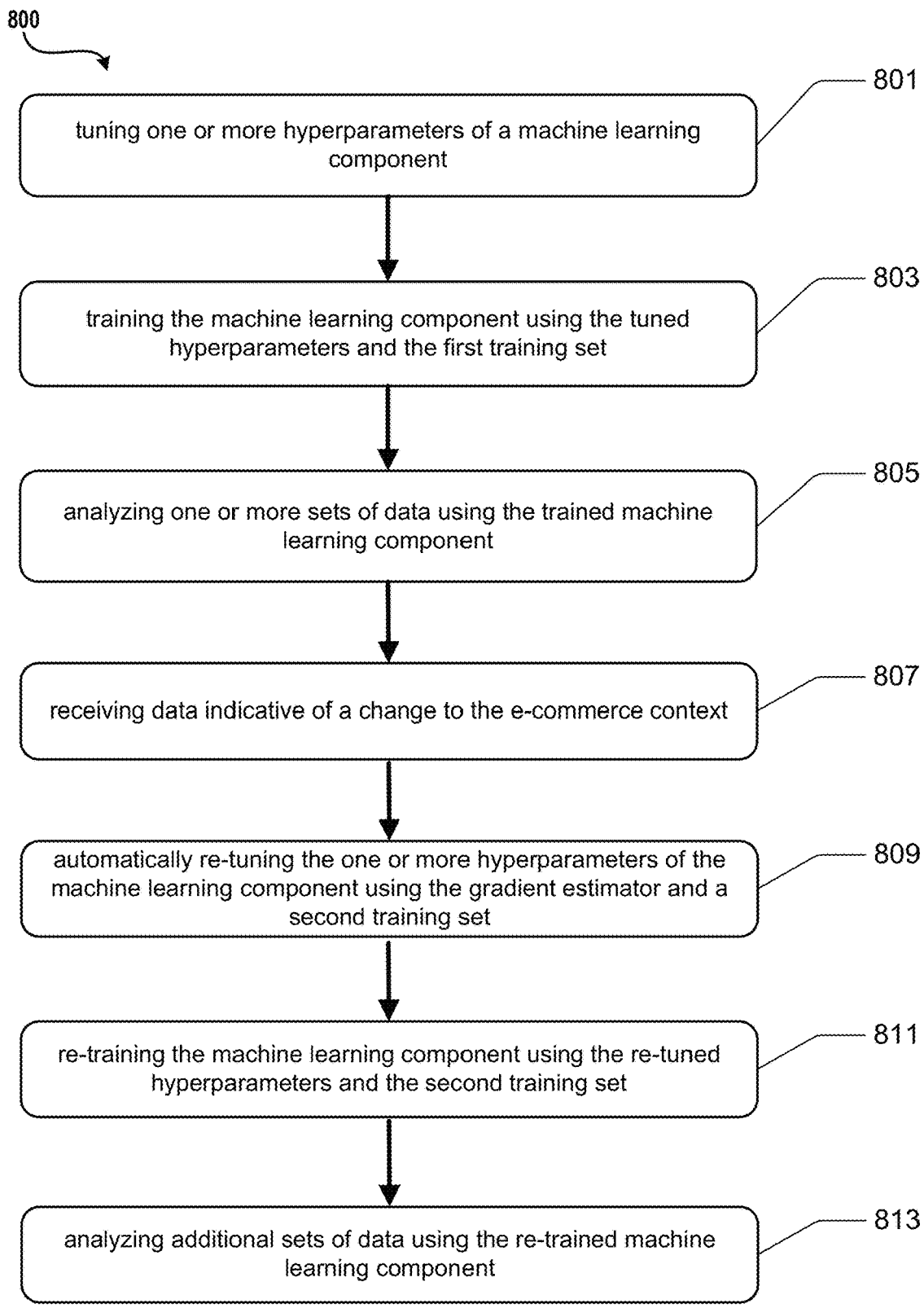
FIG. 8 is a flow diagram showing aspects of an illustrative routine, according to one embodiment disclosed herein.

FIG. 8 is a diagram illustrating aspects of a routine 800 for implementing some of the techniques disclosed herein. The routine 800 begins at operation 801, which illustrates tuning one or more hyperparameters of a machine learning component using a gradient estimator and a first training set representative of an e-commerce context. In an embodiment, a weight vector of the machine learning component is updated using a time series model and an oracle estimator.

The routine 800 then proceeds to operation 803, which illustrates training the machine learning component using the tuned hyperparameters and the first training set.

Operation 805 illustrates analyzing one or more sets of data using the trained machine learning component.

Next, operation 807 illustrates receiving data indicative of a change to the e-commerce context.

Operation 809 illustrates automatically re-tuning the one or more hyperparameters of the machine learning component using the gradient estimator and a second training set representative of the changed e-commerce context.

Operation 811 illustrates re-training the machine learning component using the re-tuned hyperparameters and the second training set.

Operation 813 illustrates analyzing additional sets of data using the re-trained machine learning component.

Figure 9:
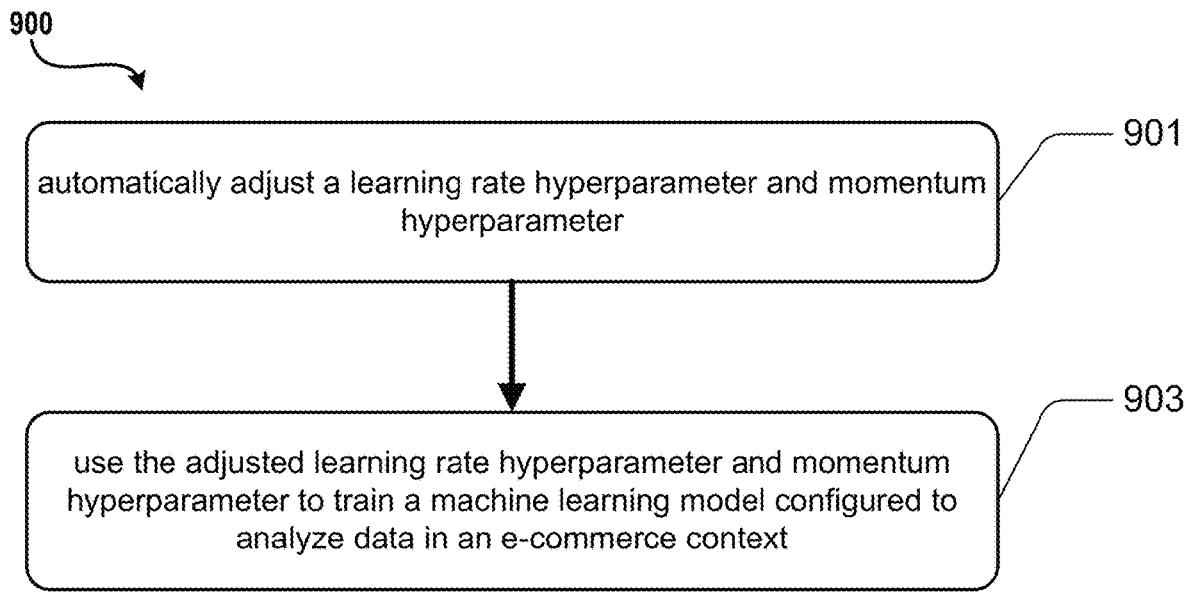
FIG. 9 is a flow diagram showing aspects of an illustrative routine, according to one embodiment disclosed herein.

FIG. 9 is a diagram illustrating aspects of a routine 900 for implementing some of the techniques disclosed herein.

The routine 900 begins at operation 901, which illustrates automatically adjusting a learning rate hyperparameter and momentum hyperparameter to maximally decrease an expected loss after an update to a weight vector.

The routine 900 then proceeds to operation 903, which illustrates using the adjusted learning rate hyperparameter and momentum hyperparameter to train a machine learning model configured to analyze data in an e-commerce context.

Figure 10:
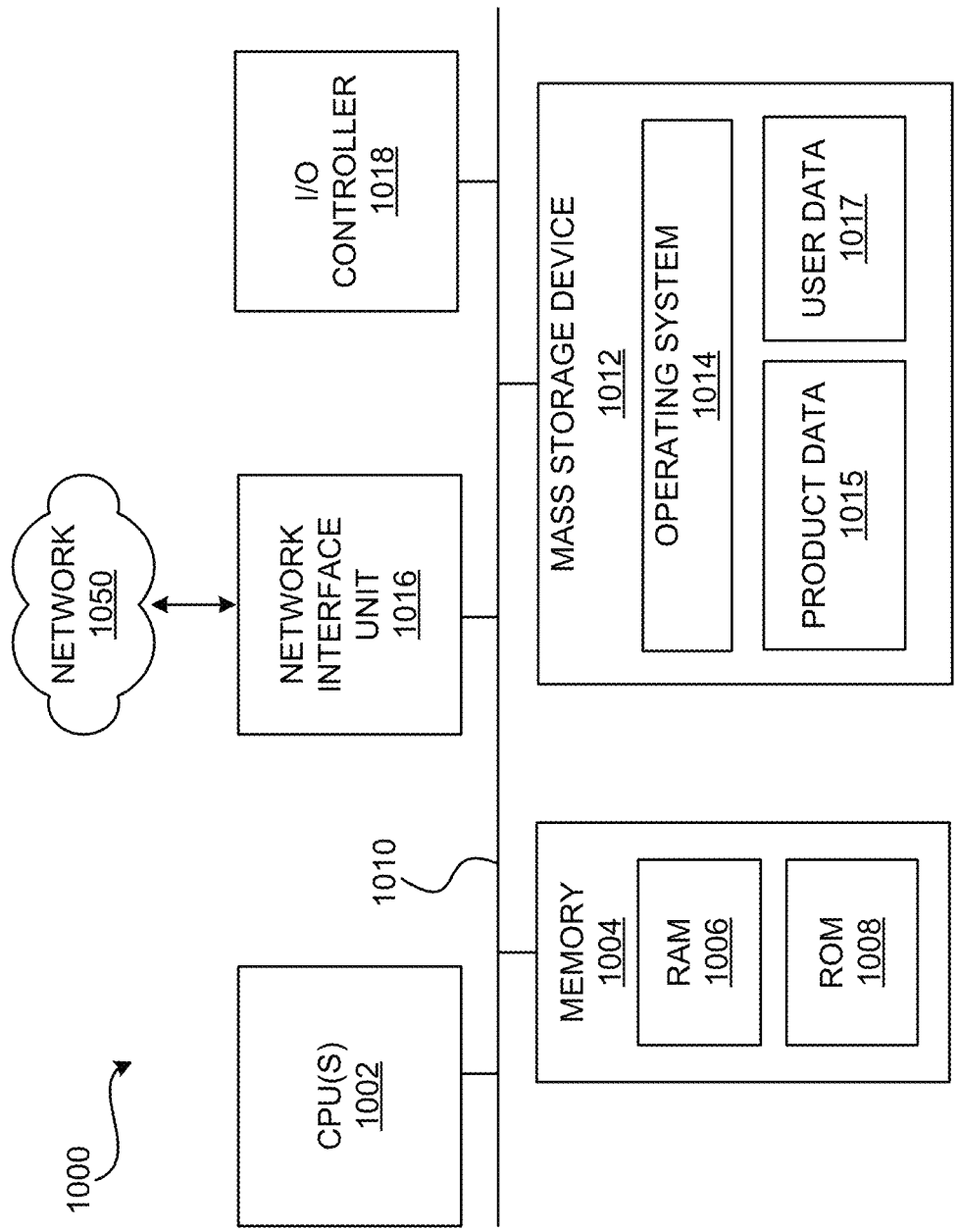
FIG. 10 is a computer architecture diagram illustrating aspects of an example computer architecture for a computer capable of executing the software components described herein.

FIG. 10 shows an example computer architecture for a computer capable of providing the functionality described herein such as, for example, a computing device configured to implement the functionality described above with reference to FIGS. 1-9. Thus, the computer architecture 1000 illustrated in FIG. 10 illustrates an architecture for a server computer or another type of computing device suitable for implementing the functionality described herein. The computer architecture 1000 might be utilized to execute the various software components presented herein to implement the disclosed technologies.

The computer architecture 1000 illustrated in FIG. 10 includes a central processing unit 1002 ("CPU"), a system memory 1004, including a random-access memory 1006 ("RAM") and a read-only memory ("ROM") 1008, and a system bus 1010 that couples the memory 1004 to the CPU 1002. A firmware containing basic routines that help to transfer information between elements within the computer architecture 1000, such as during startup, is stored in the ROM 1008. The computer architecture 1000 further includes a mass storage device 1012 for storing an operating system 1014, other data, such as product data 1015 or user data 1017.

The mass storage device 1012 is connected to the CPU 1002 through a mass storage controller (not shown) connected to the bus 1010. The mass storage device 1012 and its associated computer-readable media provide non-volatile storage for the computer architecture 1000. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1000. For purposes of the claims, the phrase "computer storage medium," "computer-readable storage medium" and variations thereof, does not include waves, signals, and/or other transitory and/or intangible communication media, per se.

According to various implementations, the computer architecture 1000 might operate in a networked environment using logical connections to remote computers through a network 1050 and/or another network (not shown). A computing device implementing the computer architecture 1000 might connect to the network 1050 through a network interface unit 1016 connected to the bus 1010. It should be appreciated that the network interface unit 1016 might also be utilized to connect to other types of networks and remote computer systems.

The computer architecture 1000 might also include an input/output controller 1018 for receiving and processing input from a number of other devices, including a keyboard, mouse, or electronic stylus (not shown in FIG. 5). Similarly, the input/output controller 1018 might provide output to a display screen, a printer, or other type of output device (also not shown in FIG. 5).

It should be appreciated that the software components described herein might, when loaded into the CPU 1002 and executed, transform the CPU 1002 and the overall computer architecture 1000 from a general-purpose computing system into a special-purpose computing system customized to facilitate the functionality presented herein. The CPU 1002 might be constructed from any number of transistors or other discrete circuit elements, which might individually or collectively assume any number of states. More specifically, the CPU 1002 might operate as a finite-state machine, in response to executable instructions contained within the software modules disclosed herein. These computer-executable instructions might transform the CPU 1002 by specifying how the CPU 1002 transitions between states, thereby transforming the transistors or other discrete hardware elements constituting the CPU 1002.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1000 in order to store and execute the software components presented herein. It also should be appreciated that the computer architecture 1000 might include other types of computing devices, including hand-held computers, embedded computer systems, personal digital assistants, and other types of computing devices known to those skilled in the art.

It is also contemplated that the computer architecture 1000 might not include all of the components shown in FIG. 5, might include other components that are not explicitly shown in FIG. 5, or might utilize an architecture completely different than that shown in FIG. 5. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 11:
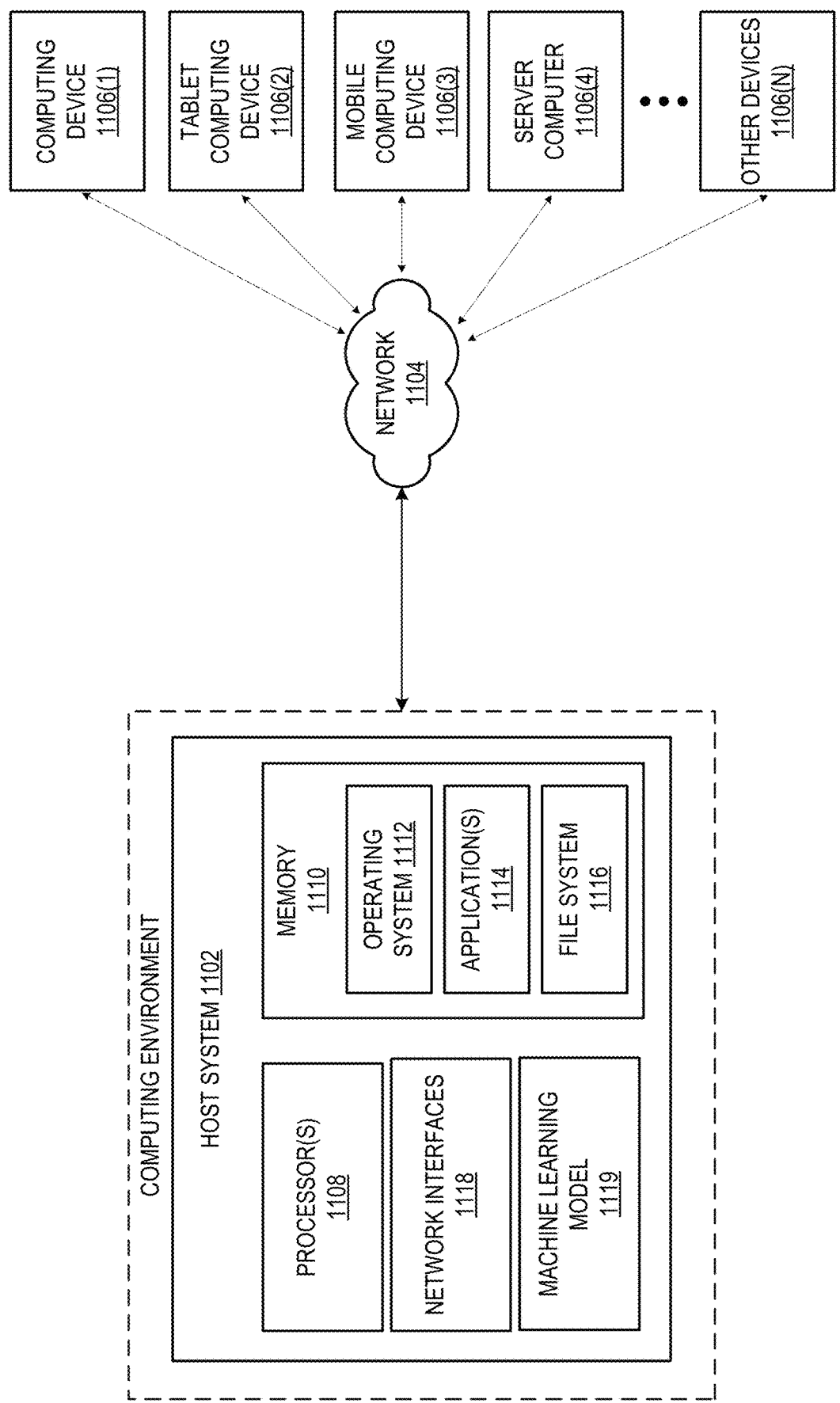
FIG. 11 is a data architecture diagram showing an illustrative example of a computer environment.

FIG. 11 illustrates an example computing environment capable of executing the techniques and processes described above with respect to FIGS. 1-10. In various examples, the computing environment comprises a host system 1102. In various examples, the host system 1102 operates on, in communication with, or as part of a network 1104.

The network 1104 can be or can include various access networks. For example, one or more client devices 1106(1) ... 1106(N) can communicate with the host system 1102 via the network 1104 and/or other connections. The host system 1102 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 1102 can be provided by one or more servers that are executing as part of, or in communication with, the network 1104. A server can host various services, virtual machines, portals, and/or other resources. For example, a can host or provide access to one or more portals, Web sites, and/or other information.

The host system 1102 can include processor(s) 1108 memory 1110. The memory 1110 can comprise an operating system 1112, application(s) 1114, and/or a file system 1116. Moreover, the memory 1110 can comprise the storage unit(s) 112 described above with respect to FIGS. 1-5.

The processor(s) 1108 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 1110.

The memory 1110 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 1102 can communicate over the network 1104 via network interfaces 1118. The network interfaces 1118 can include various types of network hardware and software for supporting communications between two or more devices. The host system 1102 may also include machine learning model 1119.

EXAMPLE CLAUSES

The disclosure presented herein may be considered in view of the following clauses.

A method of automatically adjusting a hyperparameter in a learning system, the method comprising:
 determining a loss function with an initial weight vector;
 based on an update rule, calculating an oracle estimator;
 updating a time series model based on the oracle estimator;
 calculating a gradient estimator using the time series model; and updating the weight vector using the gradient estimator.

A computing system, comprising:

one or more processors; and a computer-readable storage medium having computer-executable instructions stored thereupon which, when executed by the processor, cause the computing system to:

automatically adjust a learning rate hyperparameter and momentum hyperparameter to maximally decrease an expected loss after an update to a weight vector; and use the adjusted learning rate hyperparameter and momentum hyperparameter to train a machine learning model. The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines are described herein as being implemented, at least in part, by an application, component, and/or circuit. Although the following illustration refers to the components of specified figures, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

In closing, although the various technologies presented herein have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method of automatically adjusting machine learning parameters in an e-commerce system, the method comprising:

tuning one or more hyperparameters of a machine learning component using a tuning process, the tuning process comprising:

determining a loss function with an initial weight vector;

based on an update rule, calculating an oracle estimator;

updating a time series model based on the oracle estimator;

calculating a gradient estimator using the time series model; and updating the initial weight vector using the gradient estimator;

training the machine learning component using the tuned one or more hyperparameters and a first training set representative of an e-commerce context;

analyzing one or more sets of data using the trained machine learning component;

receiving data indicative of a change to the e-commerce context;

automatically re-tuning the one or more hyperparameters of the machine learning component using the tuning process and a second training set representative of the changed e-commerce context;

re-training the machine learning component using the re-tuned hyperparameters and the second training set; and analyzing additional sets of data using the re-trained machine learning component.

2. The method of claim 1, wherein the e-commerce context comprises a number of active buyers for a given item.

3. The method of claim 1, wherein the e-commerce context comprises a number and type of items that are available via the e-commerce system.

4. The method of claim 1, wherein the e-commerce context comprises one or more categories of inventory items.

5. The method of claim 1, wherein the e- commerce context comprises one or more local or global rules.

6. The method of claim 1, further comprising using the machine learning component to match inventory using image and text recognition.

7. The method of claim 1, further comprising using the machine learning component to generate translations of product descriptions.

8. The method of claim 1, further comprising using the machine learning component to generate personalized recommendations for users of the e-commerce system.

9. The method of claim 1, further comprising using the machine learning component to detect anomalies.

10. A computing system, comprising:
one or more processors; and
a computer-readable storage medium having computer-executable instructions stored thereupon which, when executed by the processor, cause the computing system to:
tune one or more hyperparameters of a machine learning component executing on the computing system using a tuning process, the tuning process comprising:
determining a loss function with an initial weight vector;
based on an update rule, calculating an oracle estimator;
updating a time series model based on the oracle estimator;
calculating a gradient estimator using the time series model; and
updating the initial weight vector using the gradient estimator;
train the machine learning component using the tuned one or more hyperparameters and the a first training set representative of an e-commerce context;
analyze one or more sets of data using the trained machine learning component;
in response to determining a change to the e-commerce context, automatically re-tune the one or more hyperparameters of the machine learning component using the tuning process and a second training set representative of the changed e-commerce context;
re-train the machine learning component using the re-tuned hyperparameters and the second training set; and
analyze additional sets of data using the re-trained machine learning component.

11. The computing system of claim 10, wherein the computing system implements an optimizer comprising one or more of Gauss Newton, Nesterov accelerated gradient, Adadelta, RMSprop, AdaMax, Nadam, or AMSGrad.

12. The computing system of claim 10, wherein the computing system implements a machine learning architecture comprising one or more of convolutional neural networks (CNNs), recurrent neural networks (RNNs), long-short term memory networks (LSTMs), gated recurrent units (GRUs), Hopfield networks (HN), Boltzmann machines, deep belief networks, autoencoders, or generative adversarial networks (GANs).

13. A computing system, comprising:
one or more processors; and
a computer-readable storage medium having computer-executable instructions stored thereupon which, when executed by the processor, cause the computing system to:
automatically adjust a learning rate hyperparameter and a momentum hyperparameter to maximally decrease an expected loss after an update to a weight vector; and
use the adjusted learning rate hyperparameter and momentum hyperparameter to train a machine learning model configured to analyze data in an e-commerce context;
wherein the computing system automatically adjusts the learning rate hyperparameter and the momentum hyperparameter using a tuning process, the tuning process comprising:
determining a loss function with an initial weight vector;
based on an update rule, calculating an oracle estimator;
updating a time series model based on the oracle estimator;
calculating a gradient estimator using the time series model; and
updating the initial weight vector using the gradient estimator.

14. The computing system of claim 13, wherein the computing system automatically adjusts the learning rate hyperparameter and the momentum hyperparameter using a gradient estimator and a first training set representative of the e-commerce context, wherein a weight vector of a machine learning component is updated using a time series model and an oracle estimator.

15. The computing system of claim 14, further comprising computer-executable instructions stored thereupon which, when executed by the processor, cause the computing system to:
analyze one or more sets of data using the trained machine learning component;
in response to determining a change to the e-commerce context, automatically re-tune the one or more hyperparameters of the machine learning component using the gradient estimator and a second training set representative of the changed e-commerce context;
re-train the machine learning component using the re-tuned hyperparameters and the second training set; and
analyze additional sets of data using the re-trained machine learning component.

16. The computing system of claim 13, wherein the e-commerce context comprises one or more of a number of active buyers for a given item, a number and type of items of the e-commerce context, one or more categories of inventory items, or one or more local or global rules.

17. The computing system of claim 14, further comprising computer-executable instructions stored thereupon which, when executed by the processor, cause the computing system to perform operations comprising using the machine learning component to perform one or more of matching inventory using image and text recognition, generating translations of product descriptions, generating personalized recommendations, or detecting anomalies.

18. The computing system of claim 13, wherein the computing system implements an optimizer comprising one or more of Gauss Newton, Nesterov accelerated gradient, Adadelta, RMSprop, AdaMax, Nadam, or AMSGrad.

19. The method of claim 1, wherein the one or more hyperparameters include a learning rate hyperparameter.

20. The method of claim 1, wherein the one or more hyperparameters include a momentum hyperparameter.

* * * * *